United States Patent
Cummins et al.

(10) Patent No.: US 6,935,479 B2
(45) Date of Patent: Aug. 30, 2005

(54) DRIVE APPARATUS

(75) Inventors: John F. Cummins, Kosciusko, MS (US); John L. Walker, Madison, MS (US); Phillip W. Galloway, Madison, MS (US); Philip A. Rowles, Chichester (GB)

(73) Assignee: Eaton Corporation, Cleveland, OH (US)

( * ) Notice: Subject to any disclaimer, the term of this patent is extended or adjusted under 35 U.S.C. 154(b) by 47 days.

(21) Appl. No.: 10/447,090

(22) Filed: May 28, 2003

(65) Prior Publication Data

US 2004/0238308 A1 Dec. 2, 2004

(51) Int. Cl.[7] .................. F16D 11/14; B64D 35/00
(52) U.S. Cl. ............... 192/69.8; 192/99 S; 192/101; 192/114 R; 244/60
(58) Field of Search ............... 192/69.8, 69.2, 192/89.27, 99 A, 99 S, 101, 114 R, 34; 244/60

(56) References Cited

U.S. PATENT DOCUMENTS

| | | | | |
|---|---|---|---|---|
| RE15,542 E | * | 2/1923 | Thiell .................... | 192/114 R |
| 2,064,450 A | * | 12/1936 | Spase ..................... | 192/99 A |
| 2,140,100 A | * | 12/1938 | Boldt et al. ............ | 192/114 R |
| 3,080,031 A | * | 3/1963 | Young ..................... | 192/101 |
| 3,441,116 A | * | 4/1969 | Quenneville .............. | 192/69.2 |
| 4,117,652 A | * | 10/1978 | Jones et al. ............... | 192/69.8 |
| 4,161,242 A | * | 7/1979 | Moores et al. ............. | 192/34 |
| 4,566,566 A | * | 1/1986 | Vuillet .................... | 192/99 S |
| 4,662,492 A | * | 5/1987 | Troeder .................... | 192/101 |
| 4,685,550 A | * | 8/1987 | Metcalf ................... | 192/69.8 |
| 4,915,200 A | * | 4/1990 | Jacques et al. .......... | 192/114 R |

FOREIGN PATENT DOCUMENTS

JP  57-86628 A  *  5/1982

* cited by examiner

*Primary Examiner*—Rodney H. Bonck
(74) *Attorney, Agent, or Firm*—Tarolli, Sundheim, Covell & Tummino L.L.P.

(57) ABSTRACT

A drive apparatus is provided to transmit force from a source of power to a driven assembly, such as a pump, in an aircraft. The drive apparatus can be operated from a disengaged condition back to an engaged condition when the aircraft is on the ground. The drive apparatus includes a first annular array of teeth which is connected with an input member and a second annular array of teeth which is connected with an output member. A plurality of disengagement levers extend outward from the output member. A retaining member is connected with outer end portions of the disengagement levers. An actuator member or yoke is movable to move the retaining member and the outer ends of the engagement levers to disengage the drive apparatus.

12 Claims, 7 Drawing Sheets

DRIVE APPARATUS

BACKGROUND OF THE INVENTION

The present invention relates to a new and improved drive apparatus which may be used to transmit force from a source of power to a driven assembly, such as a pump in an aircraft.

An aircraft may have a plurality of engines and a plurality of hydraulic pumps driven by each engine. If one of the pumps malfunctions, for example, leaks, a clutch may be operated to disconnect the malfunctioning pump from its source of power. The clutch should be resetable to the engaged condition only when the aircraft is on the ground. This prevents reengagement of the clutch while the aircraft is flying in the air and reestablishment of the transmission of drive force to the malfunctioning pump while the aircraft is flying.

SUMMARY OF THE INVENTION

The present invention provides a new and improved apparatus for use in transmitting force from a source of power to a driven assembly, such as a pump in an aircraft. The apparatus includes an input member which is connectable with the source of power and an output member which is connectable with the pump or other driven assembly. A first annular array of teeth is connected with the input member. A second annular array of teeth is connected with the output member.

An actuator assembly is operable while the aircraft is flying to move one of the annular arrays of teeth from an engaged position in which it is disposed in meshing engagement with the other annular array of teeth to a disengaged position to interrupt transmission of power to the pump. The actuator assembly is operable to move the one annular array of teeth from the disengaged position to the engaged position only under the influence of force transmitted to the actuator assembly.

The drive of apparatus may include a plurality of levers which extend outward from the one of the input and output members. A retaining member may be connected with outer end portions of the levers. An actuator member may be movable from a first position to a second position to move the retaining member and the outer end portions of the levers. Movement of the outer end portions of the levers moves one of the input and output members relative to the other of the input and output members to thereby interrupt meshing engagement of the annular arrays of teeth.

A latch member may be provided to block movement of the actuator member from the first position to the second position. A motor is operable to release the latch member for movement from a latching position to a release position. When the aircraft is disposed on the ground, force may be transmitted to the actuator member to move the one annular array of teeth into meshing engagement with the other annular array of teeth.

The present invention includes a plurality of different features. Anyone of these features may be used in combination with the other features of the invention or may be used separately from the other features of the invention. It is contemplated that one or more of the features of the invention may be used in combination with features found in the prior art.

BRIEF DESCRIPTION OF THE DRAWINGS

The foregoing and other features of the invention will become more apparent upon consideration of the following description taken in connection with the accompanying drawings wherein.

DESCRIPTION OF SPECIFIC PREFERRED EMBODIMENTS OF THE INVENTION

General Description

Figure 1:
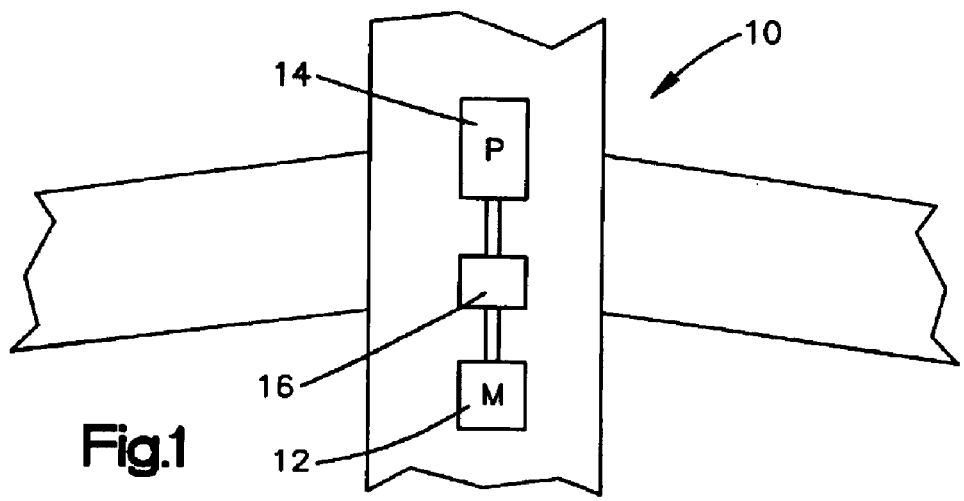
FIG. 1. is a simplified schematic illustration depicting the relationship between a motor, a drive apparatus and a pump in an aircraft.

An aircraft 10 is illustrated schematically in FIG. 1. The aircraft 10 includes a source of power 12, which may be an aircraft engine or a motor separate from the aircraft engine. The source of power 12 drives a pump 14 through a drive apparatus 16 which is constructed in accordance with the present invention. Although the drive apparatus 16 is illustrated as being used in association with a pump 14, the drive apparatus may be used to drive other devices if desired. The drive apparatus 16 may be separable from the pump 14 and/or source of power 12 to facilitate inspection, repair, or replacement of the pump.

The drive apparatus 16 is normally in an engaged condition in which it is effective to transmit force from the source of power 12 to the pump 14 or other driven assembly. However, when the aircraft 10 is flying through the air, it is contemplated that unforeseen circumstances may result in a malfunctioning of the pump 14. When the pump 14 malfunctions while the aircraft is flying, the drive apparatus 16 is operated to a disengaged condition in which the drive apparatus does not transmit force from the source of power 12 to the pump 14.

The drive apparatus 16 is maintained in the disengaged condition until the aircraft 10 lands. Once the aircraft 10 has landed and reached a service area, the pump 14 may be repaired. After the pump 14 has been repaired, the drive apparatus 16 is operated from the disengaged condition to the engaged condition.

To be certain that the drive apparatus 16 remains in the disengaged condition until after the aircraft 10 has landed, the drive apparatus can be operated from the disengaged condition to the engaged condition only under the influence of force applied to a portion of the drive apparatus. The drive apparatus 16 is accessible to enable force to be applied to the drive apparatus only when the aircraft is on the ground. This ensures that the drive apparatus 16 will not be operated from the disengaged condition to the engaged condition until there has been an opportunity to inspect and/or repair the pump 14.

Figure 4:
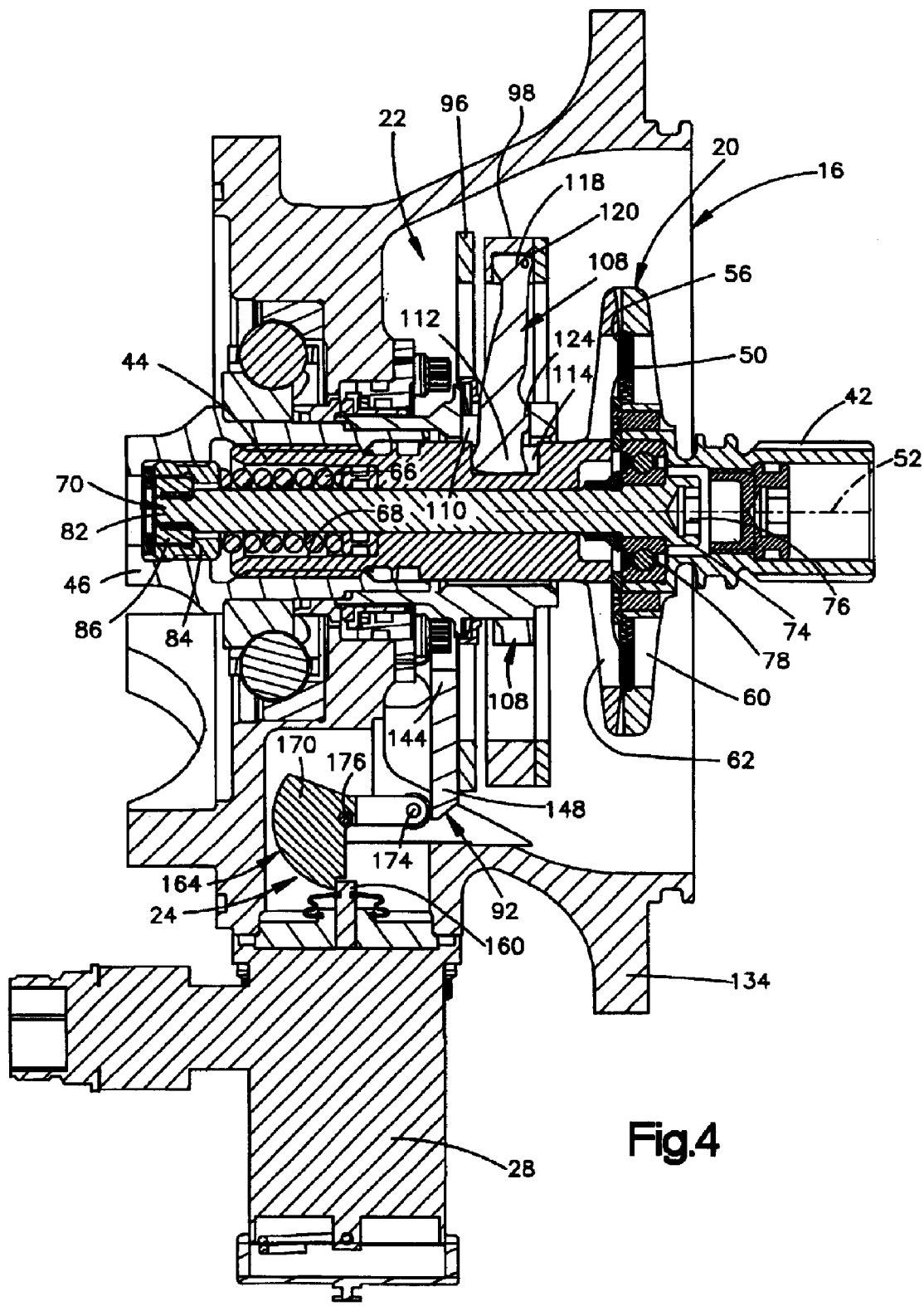
FIG. 4. is a fragmentary sectional view depicting the construction of the drive apparatus of FIGS. 2 and 3, the drive apparatus being shown in the engaged condition.
Figure 5:
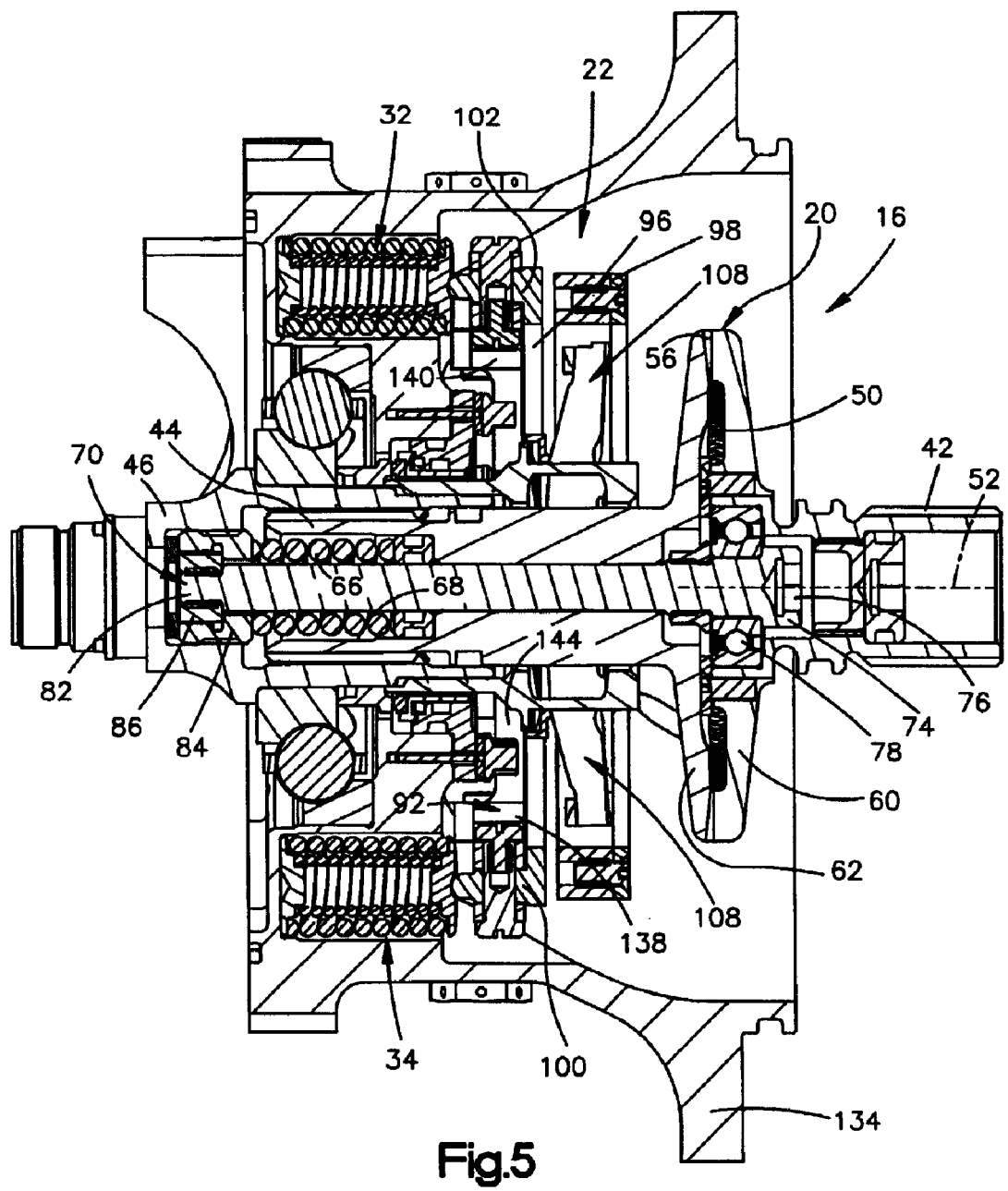
FIG. 5. is a fragmentary sectional view, generally similar to FIG. 4 and further illustrating the construction of the drive apparatus.
Figure 6:
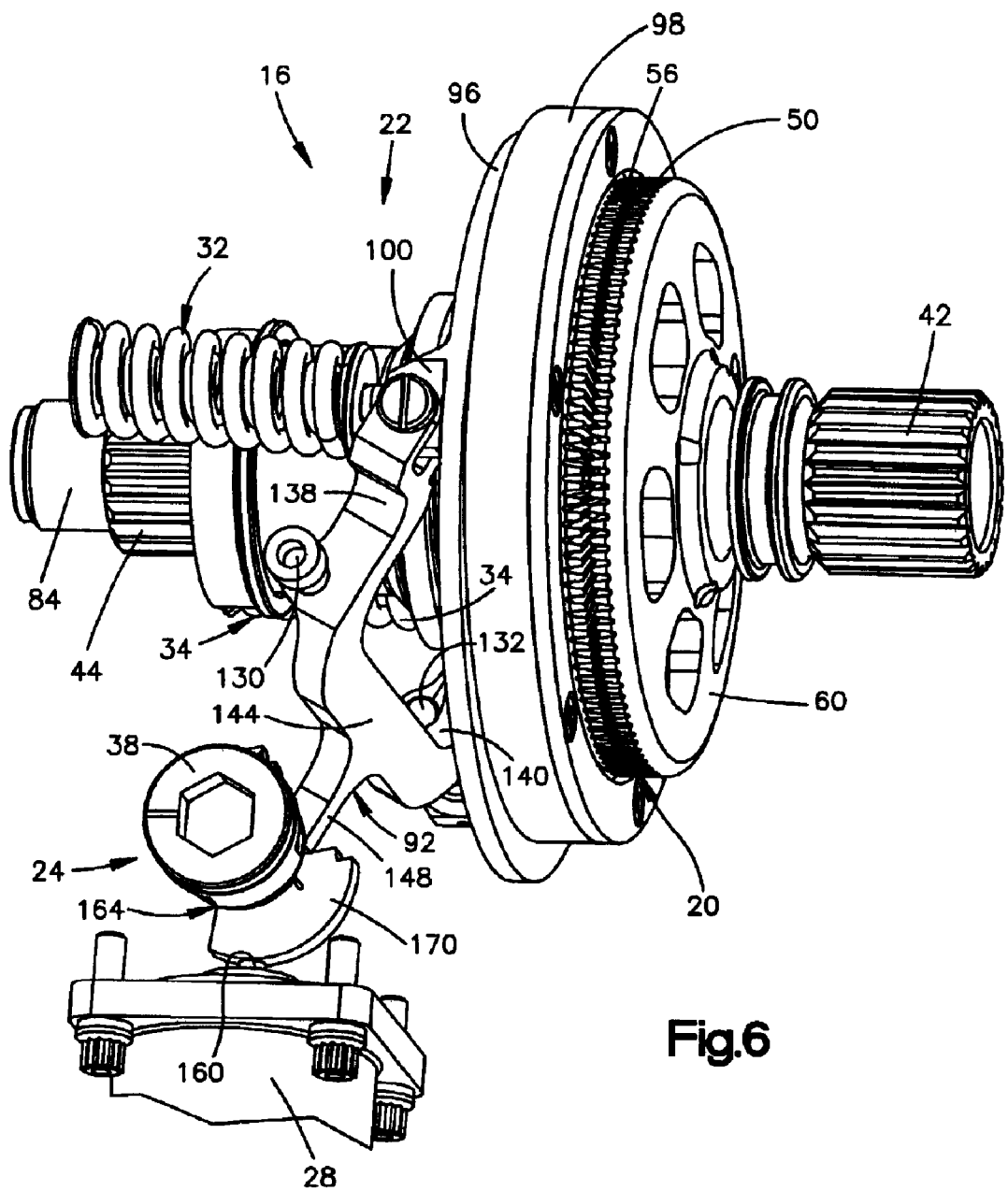
FIG. 6. is a schematic pictorial illustration, generally similar to FIG. 3, illustrating the drive apparatus in a disengaged condition in which it is ineffective to transmit power to the pump.
Figure 7:
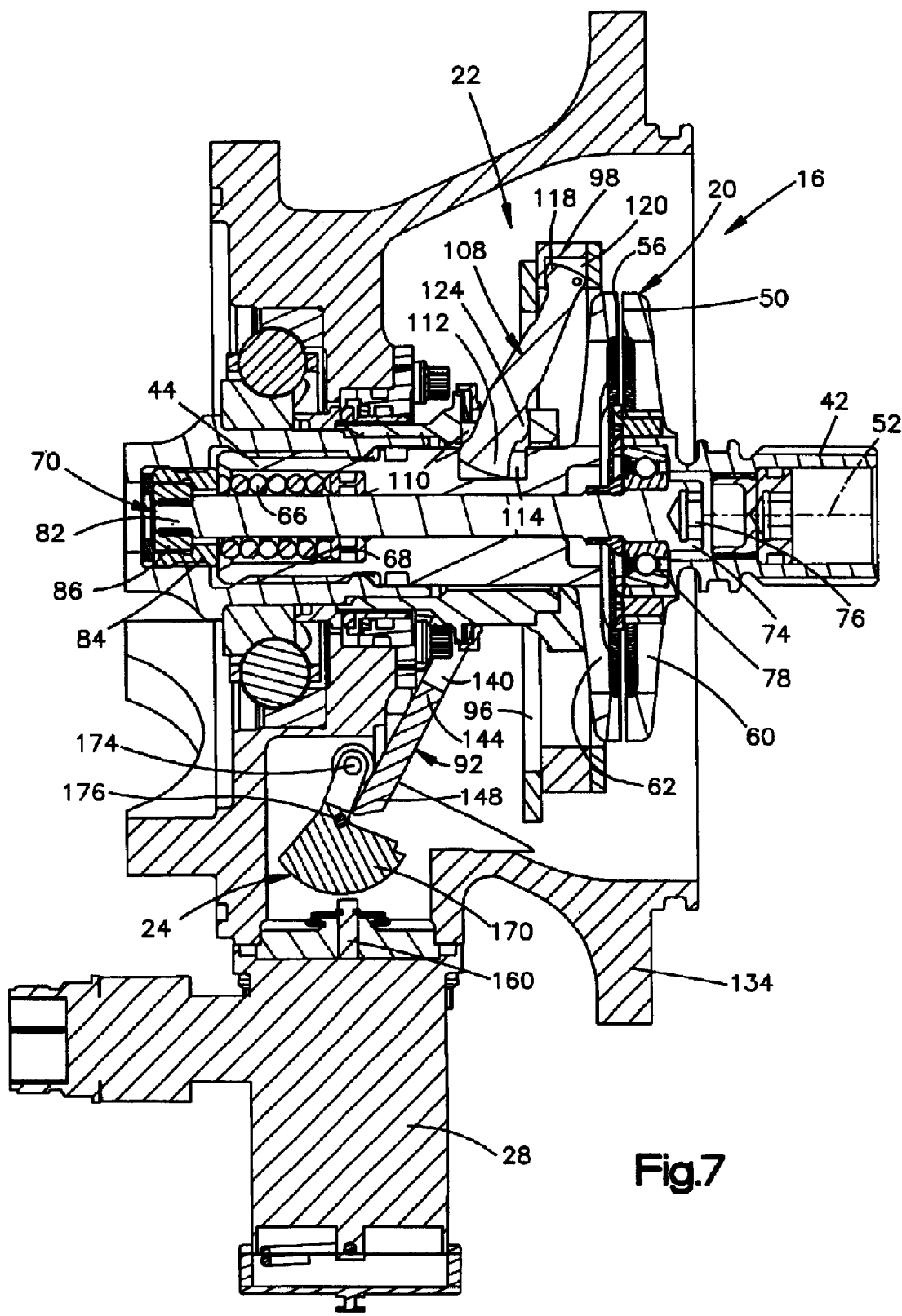
FIG. 7. is a fragmentary schematic sectional view, generally similar to FIG. 4, illustrating the drive apparatus in the disengaged condition in which it is ineffective to transmit force to the pump.
Figure 8:
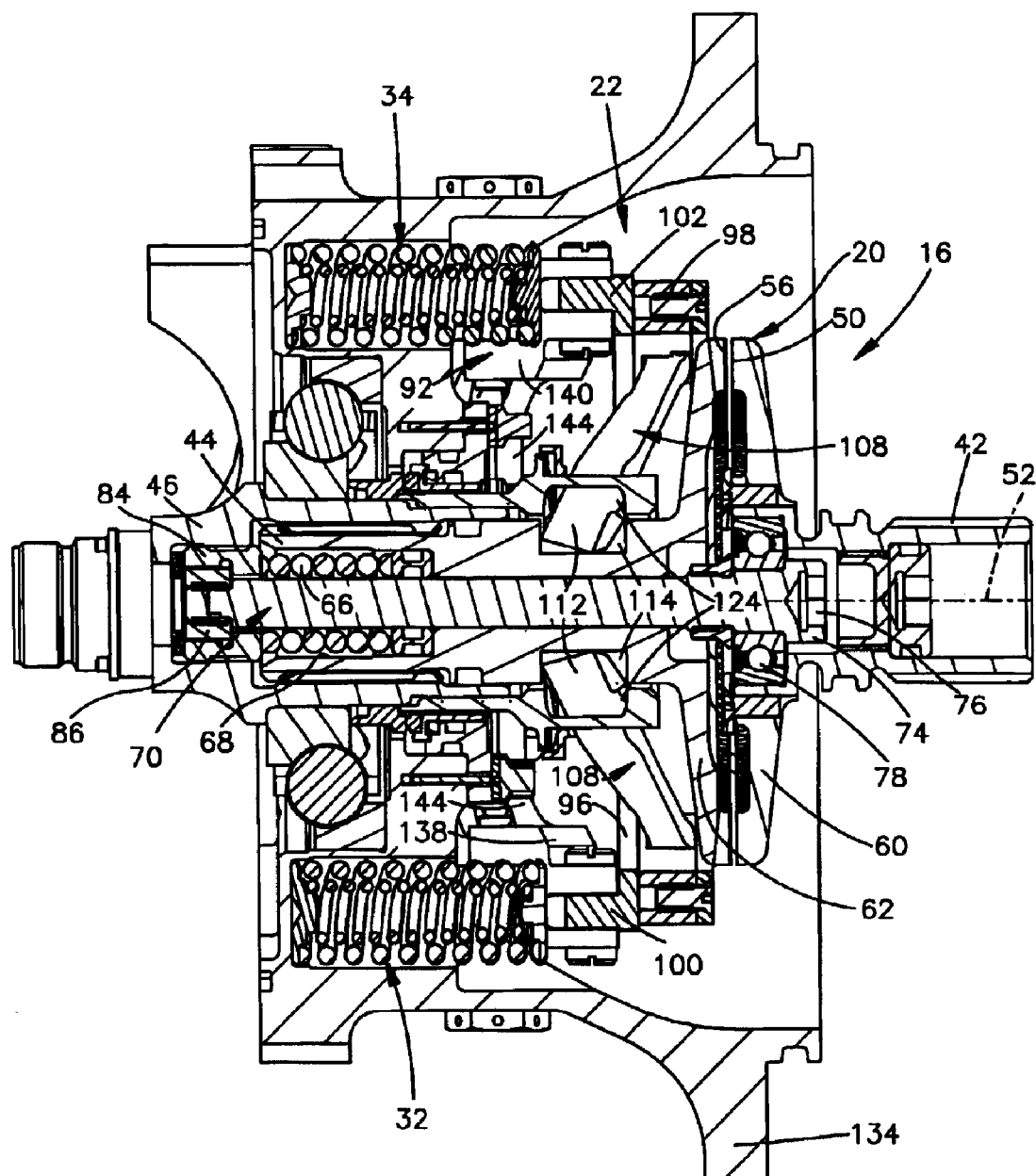
FIG. 8. is a fragmentary schematic sectional view, generally similar to FIG. 5, illustrating the drive apparatus in the disengaged condition in which it is ineffective to transmit force to the pump.

The drive apparatus 16 includes a clutch 20 which is operable between an engaged condition illustrated in FIGS. 2–5 and a disengaged condition illustrated in FIGS. 6–8. An actuator assembly 22 is operable to effect operation of the clutch 20 between the engaged and disengaged conditions. The actuator assembly 22 includes a latch assembly 24 (FIGS. 3, 4, 6, and 7). The latch assembly 24 is effective to maintain the clutch 20 in the engaged condition by blocking operation of the actuator assembly 22.

Upon operation of a motor (solenoid) 28, the latch assembly 24 is released for operation from a latching or retaining condition to a release condition under the influence of force transmitted to the latch assembly through the actuator assembly 22. As the latch assembly 24 is operated to the release condition, the actuator assembly 22 effects operation of the clutch 20 from the engaged condition of FIGS. 3–5 to the disengaged condition of FIGS. 6–8.

Force for operating the actuator assembly 22 is provided by a pair of spring units 32 and 34 (FIGS. 5 and 6). The spring units 32 and 34 are compressed to store potential energy. This potential energy is released to operate the latch assembly 24 to the release condition (FIG. 6). The potential energy stored by the spring units 32 and 34 also effects operation of the actuator assembly 22 to operate the clutch 20 from the engaged condition to the disengaged condition. Although a pair of spring units 32 and 34 are utilized, a greater or lesser number of spring units may be used if desired.

Figure 3:
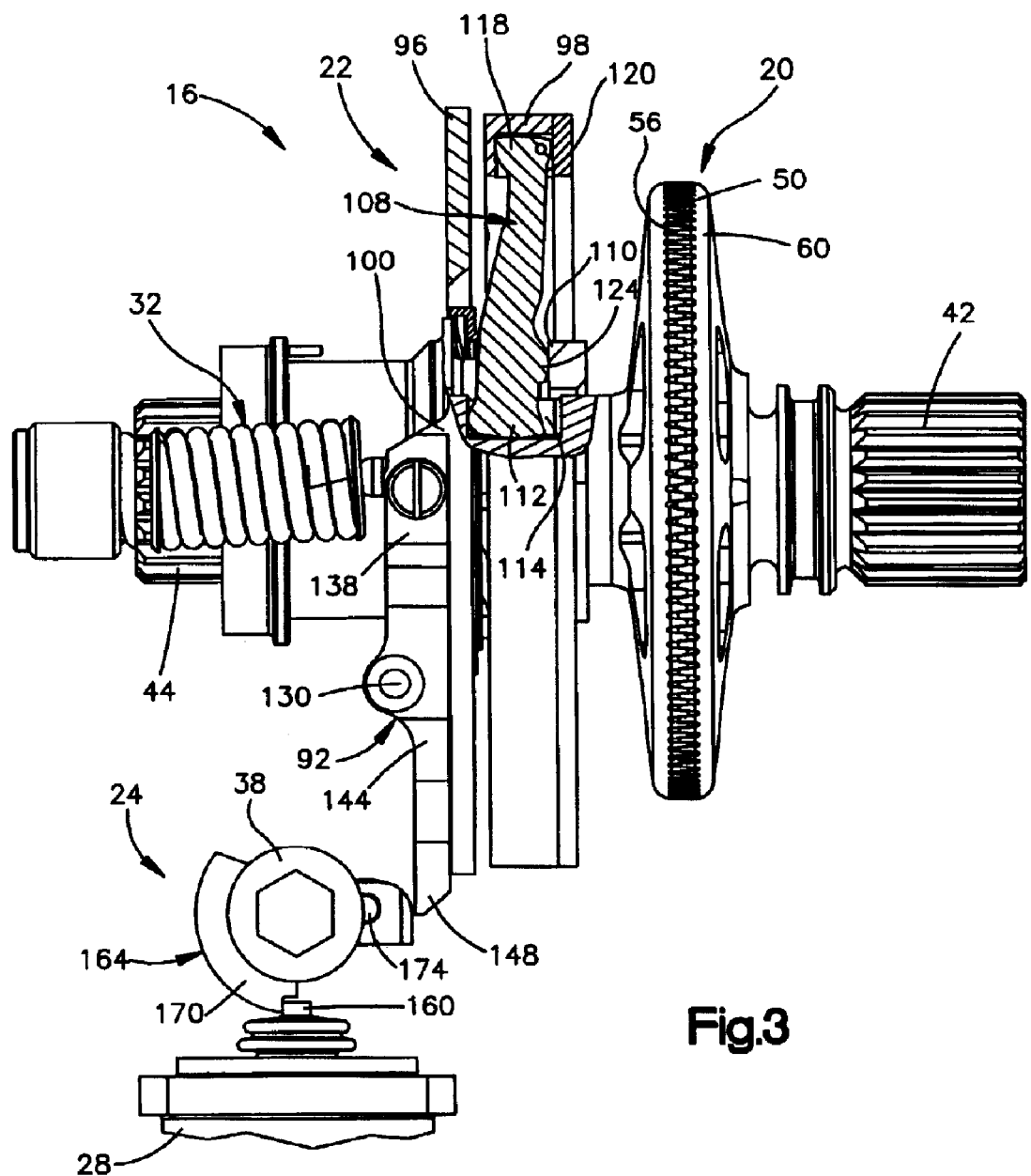
FIG. 3. is a schematic pictorial illustration depicting the construction of the drive apparatus of FIG. 2, the drive apparatus being shown in an engaged condition in which it is effective to transmit force from the source of power to the pump of FIGS. 1 and 2.

In order to operate the clutch 20 from the disengaged condition of FIGS. 6–8 back to the engaged condition of FIGS. 3–5, the spring units 32 and 34 must be compressed. To compress the spring units 32 and 34, manual force is applied to a drive member 38 in the latch assembly 24 (FIGS. 3 and 6). It should be understood that the force may be applied to the drive member 38 by a power tool or a torque wrench.

The application of force, through a manually actuated wrench or other tool, to the drive member 38 is effective to operate the actuator assembly 22 against the influence of the spring units 32 and 34. As this occurs, the clutch 20 is operated from the disengaged condition 20 of FIG. 6 back to the engaged condition of FIG. 3. As the clutch 20 is operated back to the engaged condition under the influence of force applied to the latch assembly 24, the motor 22 again moves into engagement with the latch assembly 24 to retain the latch assembly in the latching condition.

Figure 2:
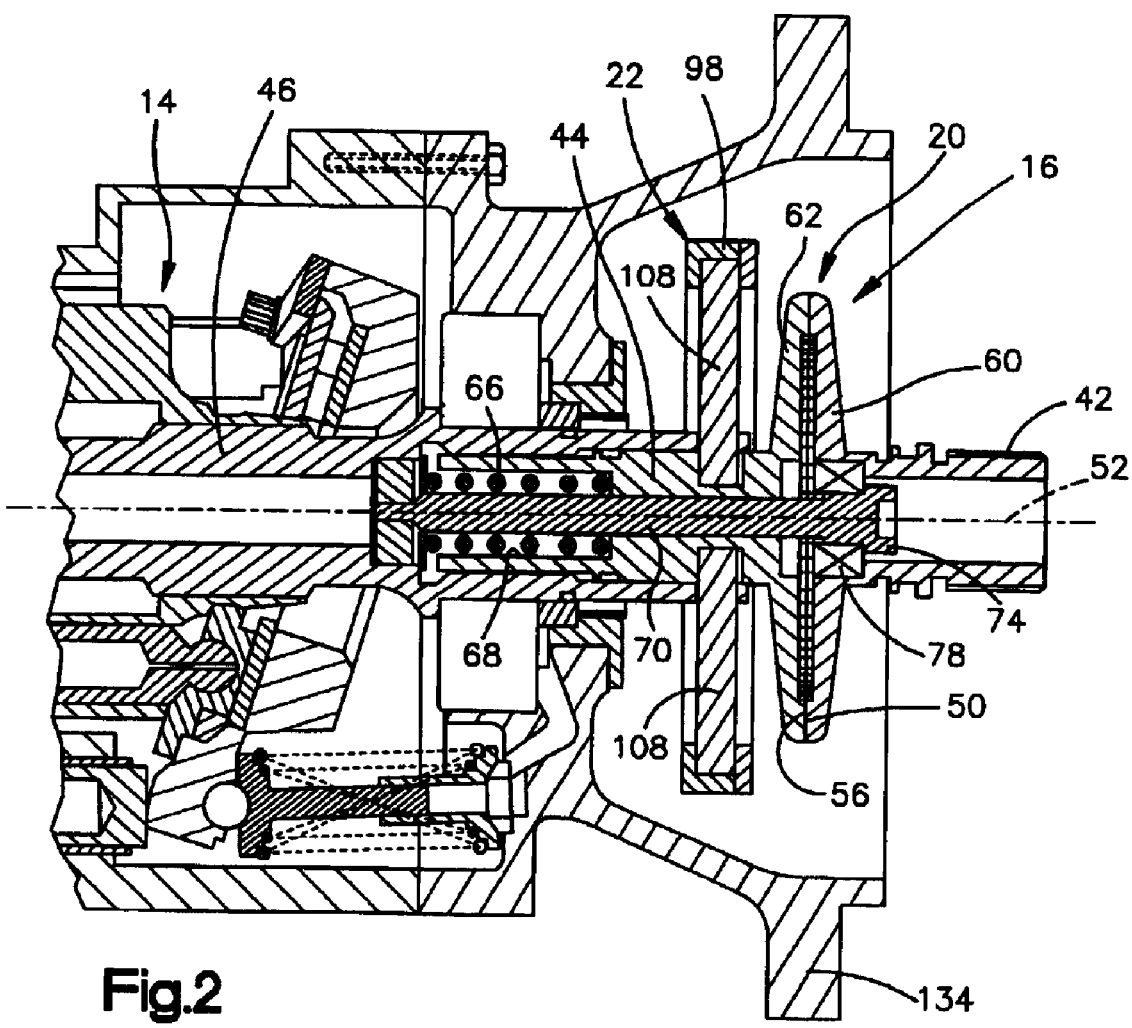
FIG. 2. is an enlarged simplified fragmentary schematic sectional view illustrating the relationship between the drive apparatus and pump of FIG. 1.

The clutch 20 is normally engaged and is effective to transmit force from the source of power 12 (FIG. 1) to the pump 14 (FIG. 2). However, in the unlikely event of malfunctioning of the pump 14 while the aircraft 10 is in flight, operating personnel on the aircraft may effect operation of the motor 28. Operation of the motor 28 enables the latch assembly 24 to be operated from the latching condition of FIGS. 3 and 4 to the release condition of FIGS. 6 and 7. As this occurs, the spring units 32 and 34 effect operation of the actuator assembly 22 to operate the clutch 20 from the engaged condition of FIGS. 3–5 to a disengaged condition of FIGS. 6–8.

The drive apparatus 16 is not accessible to personnel operating the aircraft 10 when the aircraft is flying through the air. Therefore, the operating personnel of the aircraft 10 (FIG. 1) can not reengage the clutch 20 (FIGS. 6–8) until after the aircraft has landed. This makes it certain that maintenance personnel will have had an opportunity to inspect and/or repair the pump 14 (FIG. 2) before the clutch 20 is operated to the engaged condition. Therefore, when the clutch 20 is operated to the engaged condition enabling power to be transmitted from the source 12 to the pump 14, the pump will have been repaired.

Although the drive apparatus 16 has been illustrated herein in association with an aircraft 10, it is contemplated that the drive apparatus may be utilized in a different environment if desired. For example, the drive apparatus 16 may be utilized in association with a production machine in a factory. Alternatively, the drive apparatus 16 may be utilized in association with apparatus which is to be operated in the event of an emergency and is to remain in an operated condition until after the emergency has passed. Of course, the drive apparatus 16 may be utilized in environments other than the specific environments mentioned herein. When the drive apparatus 16 is used in an aircraft, the drive apparatus may be used to drive assemblies other than the pump 14.

Clutch

The drive apparatus 16 includes an input member 42 (FIGS. 2–8) which is continuously rotated by the source of power 12 (FIG. 1) during operation of the aircraft 10. In addition, the drive apparatus includes a rotatable output member 44. The output member 44 is connected with a drive shaft 46 (FIG. 2) which is connected with the pump 14. It should be understood that the drive apparatus 16 may be connected with assemblies in the aircraft 10 other than the pump 14. The drive shaft 46 is formed of a plurality of interconnected pieces. However, the drive shaft 46 could be formed as one piece if desired.

The input member 42, output member 44 and pump drive shaft 46 are disposed in a coaxial relationship. The input member 42 is connected with the power source 12. During operation of the aircraft 10, the input member 42 is continuously driven, that is rotated, by the power source 12. When the clutch 20 is engaged and the aircraft 10 is being operated, the output member 44 and pump drive shaft 46 are rotated with the input member 42 by force transmitted from the input member.

The clutch 20 transmits from the input member 42 to the output member 44. When the clutch 20 is in the engaged condition (FIGS. 2–5) rotary drive force is constantly transmitted from the clutch 20 to the output member 44 and the pump drive shaft 46 to continuously operate the pump 14. When the clutch 20 is operated from the engaged condition to the disengaged condition of FIGS. 6–8, the transmittal of power from the input member 42 through the clutch to the output member 44 and pump draft shaft 46 is interrupted to thereby interrupt operation of the pump 14. Resumption of the transmittal of force between the input member 42 and the pump 14 can occur only after the aircraft 10 has landed and the clutch 20 has been operated to the engaged condition by the application of manual force to the drive member 38 (FIGS. 3 and 6) in the latch assembly 24.

The clutch 20 includes an annular input array of teeth 50 having a central axis which is coincident with a central axis 52 (FIGS. 4 and 7) of the drive apparatus 16. In addition, the clutch 20 includes an annular output array of teeth 56. The annular output array of teeth 56 is disposed in a coaxial relationship with the annular input array of teeth 50 and the central axis 52 of the drive apparatus 16. The annular arrays of teeth 50 and 56 face toward each other. The annular arrays of teeth 50 and 56 extend around and are coaxial with the axis 52.

When the clutch 20 is in the engaged condition of FIGS. 2–5, the annular arrays of teeth 50 and 56 are disposed in meshing engagement with each other. When the clutch 20 is in the disengaged condition of the FIGS. 6–8, the annular arrays of teeth 50 and 56 are axially spaced apart from each other. When the annular input array of teeth 50 is disposed in engagement with the annular output array of teeth 56, force is transmitted from the flanks of the annular input array of teeth 50 to the flanks of the annular output array of teeth to enable torque to be transmitted from the source of power 12 (FIG. 1) to the pump 14 through the clutch 20 (FIGS. 2–5).

The teeth in the annular input array of teeth 50 extend along the central axis 52 of the drive apparatus 16. Similarly, the teeth in the annular output array of teeth 56 extend along the central axis 52 of the drive apparatus 16. The crest and roots of the annular arrays of gear teeth 50 and 56 extend transverse to the axis 52. The gear teeth in the annular arrays of gear teeth 50 and 56 are crowned to facilitate engagement of the gear teeth.

The annular input array of gear teeth 50 are disposed on a circular input plate 60. The input plate 60 is fixedly connected to the input member 42 and has a central axis which is coincident with the central axis 52 of the drive apparatus 16 and the central axis of the annular input array of teeth 50. In the embodiment of the invention illustrated on FIGS. 1–8, the input plate 60 is integrally formed as one piece with the input member 42 and the annular input array of teeth 50. However, the input plate 60 may be formed separately from and fixedly connected with the input member 42 and/or the annular input array of teeth 50.

Similarly, the annular output array of teeth 56 is disposed on a circular output plate 62. The circular output plate 62 is disposed in a coaxial relationship with and has the same diameter as the input plate 60. The circular output plate 62 is integrally formed as one piece with the output member 44 and the annular output array of gear teeth 56. However, if desired, the output plate 62 may be formed separately from and fixedly connected to the input member 44 and/or the output array of teeth 56.

The clutch 20 is continuously urged toward the engaged condition of FIGS. 2–5 by a helical clutch engagement spring 66 (FIGS. 4 and 5). The clutch engagement spring 66 is disposed in a cylindrical recess 68 in the generally cylindrical output member 44 (FIG. 4). If desired, the clutch 20 may be urged toward the engaged condition by apparatus other than the clutch engagement spring 66. For example, a different type of spring, hydraulic pressure, or pneumatic pressure may be used.

A cylindrical shaft 70 is disposed in a coaxial relationship with the spring 66, recess 68 and drive axis 52. The shaft 70 interconnects the pump drive shaft 46 and input member 42. The spring 66 applies force to the output member 44 urging the output array of teeth 56 toward the input array of teeth 50.

A right (as viewed in FIG. 4) end portion 74 of the shaft 70 has annular shoulder or head 76 which engages a sealed deep groove bearing 78. Of course, a different type of bearing may be used. The annular bearing 78 allows the input member 42 and input plate 60 of the clutch 20 to rotate relative to the shaft 70 about the central axis 52 of the drive apparatus 16 when the clutch is disengaged. The opposite or left (as viewed in FIG. 4) end portion 82 of the shaft 70 is fixedly connected to the pump drive shaft 46 by a retaining plug 84 and a threaded plug 86.

When the clutch 20 is in the engaged condition, the spring 66 applies a rightward (as viewed in FIG. 4) directed force against the output member 44. This rightward directed force presses the annular output array of teeth 56 on the output plate 62 against the annular array of teeth 50 on the input plate 60. When the clutch 20 is to be operated to the disengaged condition, the actuator assembly 22 is operated to slide the output member 44 leftward (as viewed in FIGS. 4 and 7) along the shaft 70. As this occurs, the coil spring 66 is compressed between the output member 44 and the retaining plug 84.

When the clutch 20 is in the disengaged condition (FIG. 7), the actuator assembly 22 is effective to hold the annular output array of teeth 56 against the influence of the spring 66. Whenever the actuator assembly 22 is operated by the application of manual force to the latch assembly 24, the spring 66 is effective to slide the output member 44 toward the right (as viewed in FIG. 7). This moves the annular output array of teeth 56 into meshing engagement with the annular input array of teeth 50 in the manner illustrated in FIG. 4.

Although the output member 44 is movable to disengage the clutch 20, the drive apparatus 16 may be constructed in such a manner as to have the input member 42 move to disengage the clutch 20. If this is done, the actuator assembly 22 would be associated with the input member 42 rather than the output member 44.

Although the clutch engagement spring 66 is located in the cylindrical recess 66 in the output member 44, the spring could be located in a different position if desired. For example, the clutch engagement spring 66 may extend around the output member 44. If desired, a plurality of clutch engagement springs may be provided in association with either the output plate 62 or the input plate 60 of the clutch 20.

Actuator Assembly

The actuator assembly 22 effects operation of the clutch 20 between the engaged condition of FIGS. 2–5 and the disengaged condition of FIGS. 6–8. The actuator assembly 22 includes an actuator member or yoke 92 (FIGS. 3 and 6) which transmits force between the spring units 32 and 34 (FIGS. 5 and 8) and the latch assembly 24 when the clutch 20 is in the engaged condition of FIGS. 3–5. When the clutch 20 is in the disengaged condition of FIGS. 6–8, force is transmitted directly from the spring units 32 and 34 to an annular contact plate 96. The annular contact plate 96 is effective to transmit the spring force to an annular retaining member or ring 98.

The force transmitted from the spring units 32 and 34 through the contact plate 96 to the retaining member or ring 98 is effective to move the retaining member or ring axially along the central axis 52 of the drive apparatus 16. As this occurs, the output member 44 and plate 62 are moved leftward (as viewed in FIGS. 4 and 7) along the axis 52 from the engaged position illustrated in FIG. 4 to the disengaged position illustrated in FIG. 7. The annular output array of teeth 56 moves leftward (as viewed in FIGS. 4 and 7) and is disengaged from the annular input array of teeth 50. The output plate 62 and output member 44 move axially along the shaft 70 with the annular output array of gear teeth 56 as the clutch 20 is operated to the disengaged condition of FIG. 6–8.

When the clutch 20 is in the engaged condition of FIGS. 2–5, the force of the springs 32 and 34 is transmitted to the actuator member or yoke 92. At this time, the yoke 92 is held against pivotal movement from the engaged position of FIG. 3 by the latch assembly 24. The contact plate 96 is connected with the yoke 92 by a pair of mounting sections 100 and 102 (FIG. 5) which are integrally formed as one piece with the contact plate 96 (FIG. 3). The yoke 92 is effective to hold the annular contact plate 96 out of engagement with the annular retaining ring 98 when the clutch 20 is in the engaged condition of FIG. 4.

A plurality of disengagement levers 108 extend radially outward from the output member 44 (FIG. 4) through openings 110 in the pump drive shaft 46. As was previously mentioned, the drive shaft 46 is formed by a plurality of interconnected pieces.

The disengagement levers 108 are identical in construction and have radially inner end portions 112 which are disposed in recesses 114 formed in the output member 44. The disengagement levers 108 have radially outer end portions 118 which are disposed in recesses 120 formed in the annular retaining member or ring 98. Protuberances 124 on the disengagement levers 108 are disposed in the openings 110 formed in the pump drive shaft 46 and form pivots for the disengagement levers.

When the latch assembly 24 is operated to a released condition (FIG. 7), the yoke 92 pivots about connections 130 and 132 (FIG. 6). The pivot connections 130 and 132 are formed between the yoke 92 and a housing 134 (FIGS. 4 and 7) which encloses the drive apparatus 16.

The actuator member or yoke 92 has a generally Y-shaped configuration and includes a pair of parallel arms 138 and 140 (FIG. 6). The yoke 92 has a connector section 144 (FIG. 6) which extends between the arms 138 and 140 of the yoke 92. In addition the yoke 92 includes an arm 148 which extends from the connector section 144 of the yoke. The arm 148 extends parallel to the arms 138 and 140 of the yoke 92. It should be understood that the yoke 92 may have a configuration other than the illustrated Y-shaped configuration. Although the yoke 92 is integrally formed as one piece, the yoke may be formed as a plurality of pieces.

When the clutch 20 is in the engaged condition illustrated in FIGS. 2–5, force is transmitted from the spring units 32 and 34 (FIGS. 3 and 5) to the arms 138 and 140 of the yoke 92. This force urges the yoke 92 to pivot in a clockwise direction (as viewed in FIGS. 3 and 4) about the pivot connections 130 and 132 (FIGS. 3 and 6). The arm 148 of the yoke 92 is held in the engaged position illustrated in FIG. 4 by the latch assembly 24. At this time, the annular contact plate 96 is held in a spaced apart relationship with the retaining ring 98 by the mounting sections 100 and 102 (FIG. 5) on the contact plate. The spring 66 is effective to press the annular output array of teeth 56 against the annular input array of teeth 50 in the clutch 20 under the influence of force applied against the output member 44. This results in the disengagement levers 108 being held in the radially outward extending engaged condition illustrated in FIG. 4.

When the clutch 20 is to be operated to the disengaged condition, the motor 28 is operated to release the latch assembly 24 for operation from the latching condition of FIGS. 3 and 4 to the released condition of FIGS. 6 and 7. As this occurs, the yoke 92 pivots in a clockwise direction (as viewed in FIGS. 3 and 6) about the pivot connections 130 and 132 (FIG. 6). Clockwise pivotal movement of the yoke 92 about the pivot connections 130 and 132 occurs under the influence of force transmitted from the spring units 32 and 34 to outer end portions of the arms 138 and 140 of the yoke 92.

Since the outer ends of the arms 138 and 140 of the yoke 92 are connected with the contact plate 96 at the mounting section 100 and 102 (FIGS. 5 and 8), the clockwise pivotal movement of the yoke about the pivot connections 130 and 132 is effective to move the contact plate 96 toward the right from the disengaged position illustrated in FIG. 4 to the engaged position illustrated in FIG. 7. As this occurs, the annular contact plate 96 is pressed against the annular retaining member or ring 98. The retaining ring 98 is moved axially toward the right from the engaged position of FIG. 4 to the disengaged position of FIG. 7.

The rightward movement of the retaining ring 98 is effective to pivot the disengagement levers 108 about the protuberances 124 in a direction toward the output plate 62 of the clutch 20. As the disengagement levers 108 are pivoted by movement of the contact plate 96 and retaining ring 98, the inner end portions 112 of the disengagement levers 108 move the output member 44 toward the left from the engaged position of FIG. 4 to the disengaged position of FIG. 7. This leftward movement of the output member 44 along the central axis 52 of the drive apparatus 16 is effective to move the annular output array of teeth 56 out of engagement with the annular input array of teeth 50 to effect disengagement of the clutch 20. Once the clutch 20 has been disengaged, it is ineffective to transmit force from the input member 42 to the output member 44.

When the contact plate 96 moves into engagement with the retaining ring 98 to effect operation of the clutch 20 to the disengaged condition, the retaining ring is rotating with the clutch 20. However, the contact plate 96 is not rotating. This results in the retaining ring 98 sliding along a flat annular side surface on the contact plate 96.

To accommodate this sliding action, the surface of the retaining ring 98 may be electronically coated with a dry film lubricant in accordance with Department of Defense No. L-85645A Type 1. One specific dry film lubricant is commercially available under the trademark "DICRONITE" from Lubrication Services, Inc., a corporation of California. The contact plate 96 may be coated with "TEFLON" (tetrafluoroethylene). Of course, other lubricants may be utilized if desired.

A switch (not shown) is actuated by the contact plate 96 when the clutch 20 is in the engaged condition. When the contact plate 96 is moved to operate the clutch to the disengaged condition (FIG. 7), the switch is released. The resulting operation of the switch provides an indication to personnel operating the aircraft 10 that the clutch 20 is disengaged. It is contemplated that the switch may be operated by components of the drive apparatus 16 other than the contact plate 96. If desired, the switch may be omitted.

Latch Assembly

The latch assembly 24 is operable from the latching position of FIGS. 3 and 4 to the release position of FIGS. 6 and 7 in response to operation of the motor 28. The motor 28 is of the solenoid type and includes a central armature 160 (FIGS. 3 and 4). However, it should be understood that a different type motor may be utilized. If desired, a link or latch member may be moved by the motor 28.

Prior to operation of the motor 28, the armature 160 projects from the motor and engages the linkage assembly 164. At this time, the linkage assembly 164 engages the arm 148 on the yoke 92. The linkage assembly 164 blocks pivotal movement of the yoke 92 from the engaged position of FIGS. 3 and 4 to the disengaged position of FIGS. 6 and 7.

When the motor 28 is operated, the armature 160 is retracted. When the armature 160 is retracted, force transmitted from the spring units 32 and 34 through the yoke 92 to the linkage assembly 164 is effective to pivot a retaining link 170 in a counter clockwise direction (as viewed in FIG. 4) from a latching position. As the retaining link pivots from the latching position of FIG. 4 to the release position of FIG. 6, the yoke 92 pivots in a clockwise direction (as viewed in FIGS. 3, 4, 6, and 7) about the pivot connections 130 and 132 (FIG. 6). This pivotal movement of the yoke 92 is effective to operate the clutch 20 from the engaged condition to the disengaged condition in the manner previously explained in conjunction with the disengagement levers 108.

The retaining link 170 (FIGS. 3, 4 6 and 7) includes a retaining pin 174 (FIG. 4) which is engaged by the arm 148 of the yoke 92. The pin 174 has a center which is offset upward (as viewed in FIG. 4) from the center of a support shaft 176 about which the retaining link 170 pivots. Therefore, as soon as the central armature 160 of the motor 28 is retracted, force transmitted from the yoke 92 to the linkage assembly 164 is effective to pivot the retaining link 170 in a counter clockwise direction from the latching position illustrated in FIG. 4 to the release position illustrated in FIG. 7.

Subsequent operation of the motor 28 is ineffective to cause the latch assembly 24 to rotate from the release position of FIG. 7 back to the latching position of FIG. 4. The only way in which the latch assembly 24 can be operated back to the latching condition of FIG. 4 is to apply force to the drive member 38 (FIGS. 3 and 6). The drive member 38 is inaccessible to personnel on the aircraft 10 when the aircraft is flying through the air. When the aircraft 10 is on the ground, the drive member 38 is accessible to maintenance personnel on the ground. Force may be applied to the drive member 38 with a manually actuated tool or with a suitable power tool.

The drive member 38 is fixedly connected to the shaft 176 and the retaining link 170. Therefore, the application of a clockwise torque to the drive member 38 is effective to rotate the drive member, the shaft 176 and the retaining link 170 in a clockwise direction (as viewed in FIG. 6). This torque or force is sufficient to cause the yoke 92 to pivot in a counter clockwise direction about the pivot connections 130 and 132 (FIG. 6) to move the yoke from the disengaged position of FIG. 6 back to the engaged position of FIG. 3. As this occurs, the retaining link 170 moves past the armature 160 and a biasing spring in the motor 28 causes the armature 160 to move outward to again engage the retaining link in the manner illustrated in FIG. 3.

As the yoke 92 pivots in a counter clockwise direction from the disengaged position of FIG. 6 back to the engaged position of FIG. 3, the contact plate 96 is moved toward the left, that is in a direction away from the output plate 62 of the clutch 20. As this occurs, the spring 66 moves the output member 44 toward the right (as viewed in FIG. 7) to the engaged position of FIG. 4. This causes the annular output array of teeth 56 to move axially toward the annular input array of teeth 50. As this occurs, the annular output array of, gear teeth 56 moves into meshing engagement with the input array of gear teeth 50. At this time, the power source 12 has been deactivated and the input member 42 is not rotating.

Operation

When the aircraft 10 is flying in a normal manner through the air, the pump 14 or other assembly is continuously driven by torque transmitted from the power source 12 through the drive apparatus 16. In the unlikely event of a failure of the pump 14, the clutch 20 in the drive apparatus 16 is operated from the engaged condition of FIGS. 2–5 to the disengaged condition of FIGS. 6–8.

To effect operation of the clutch 20 to the disengaged condition, the motor 28 is operated. Operation of the motor 28 moves the armature 160 downward (as viewed in FIG. 4) out of engagement with the latch assembly 24. This releases the retaining link 170 for pivotal movement from the latching position of FIG. 4 to the release position of FIG. 7. As the retaining link 170 pivots to the released position of FIG. 7, the yoke 92 pivots in a clockwise direction about the pivot connections 130 and 132 (FIG. 6) under the influence of force transmitted from the spring units 32 and 34 to the arms 138 and 140 of the yoke. The force transmitted from the spring units 32 and 34 to the yoke 92 is also effective to move the contact plate 96 toward the right from the position illustrated in FIG. 3 to the position illustrated in FIG. 6.

As this occurs, force is transmitted from the contact plate 96 to the retaining member or ring 98. This force is sufficient to move the contact plate 96 and retaining ring 98 toward the clutch 20. As the retaining ring 98 is moved toward the right from the position illustrated in FIG. 3 to the position illustrated in FIG. 6, the disengagement levers 108 (FIG. 4) are pivoted relative to the pump drive shaft 46 in a direction toward the clutch 20. Thus, the disengagement levers 108 pivot from the orientation illustrated in FIG. 4 to the orientation illustrated in FIG. 7.

As the disengagement levers 108 pivot toward the orientation illustration in FIG. 7, the output member 44 is moved toward the left (as viewed in FIG. 4). This moves the output plate 62 and annular output array of gear teeth 56 in the clutch 20 away from the input plate 60 and annular input array of teeth 50 in the clutch. As this occurs, the clutch 20 is operated to the disengaged condition.

Disengagement of the clutch 20 interrupts the transmission of force from the source 12 of power through the drive apparatus 16 to the pump 14. Therefore, operation of the malfunctioning pump 14 is interrupted.

The clutch 20 can only be reengaged after the aircraft has landed and is on the ground. This is because the clutch 20 can only be reengaged by the application of force to the drive member 38. The drive member 38 is accessible only when the aircraft 10 is on the ground.

When the aircraft 10 has landed, that is when the aircraft is no longer flying through the air, the malfunctioning pump 14 may be repaired. Once the pump 14 has been repaired, the clutch 20 is operated from the disengaged condition of FIGS. 6–8 back to the engaged condition of FIGS. 2–5. When the clutch is operated to the engaged condition, the input member 42 is not being rotated by the source of power 12.

To operate the clutch 20 from the disengaged condition back to the engaged condition, a suitable wrench or other tool is moved into engagement with the drive member 38. Manual application of force to the tool is effective to rotate the drive member 38 and the retaining link 170 in a clockwise direction as viewed in FIG. 6. This rotation of the retaining link 170 is effective to pivot the yoke 92 in a counter clockwise direction about the pivot connections 130 and 132.

As the yoke 92 is pivoted in a counter clockwise direction by the retaining link 170 in the latch assembly 24, the spring units 32 and 34 are compressed. At the same time, the contact plate 96 is moved toward the left (as viewed in FIG. 6) in a direction away from the retaining ring 98. As this occurs, the spring 66 is effective to move the output member 44 toward the right (as viewed in FIG. 8). This rightward movement of the output member 44 is effective to pivot the disengagement links 108 in a direction away from the clutch 20. This results in the retaining ring 98 being moved from the disengaged position of FIG. 8 back to the engaged position of FIGS. 4 and 5. Once the clutch 20 has been operated to the engaged condition of FIGS. 4 and 5, a spring in the motor 28 causes the central armature 162 to be extended to again engage the retaining link 170 and hold the latch assembly 24 in the latching condition of FIGS. 3 and 4.

Although operation of the drive apparatus 16 has been described with the pump 14 being the assembly which is driven by the power source 12, the drive apparatus may be connected with a driven assembly having a construction and mode of operation which is different than the construction and mode of operation of the pump 14.

Conclusion

The present invention provides a new and improved apparatus 16 for use in transmitting force from a source of power 12 to a pump 14 in an aircraft 10. The apparatus 16 includes an input member 42 which is connectable with the source of power 12 and an output member 44 which is connectable with the pump 14 or other driven assembly. A first annular array of teeth 50 is connected with the input member 42. A second annular array of teeth 56 is connected with the output member 44.

An actuator assembly 22 is operable while the aircraft is flying to move one of the annular arrays of teeth 56 from an engaged position in which it is disposed in meshing engagement with the other annular array of teeth 50 to a disengaged position to interrupt transmission of power to the pump 14. The actuator assembly 22 is operable to move the one annular array of teeth 56 from the disengaged position to the engaged position only under the influence of force transmitted to the actuator assembly.

The drive of apparatus 16 may include a plurality of levers 108 which extend outward from the one of the input and output members 42 and 44. A retaining member 98 may be connected with outer end portions 118 of the levers 108. An actuator member 92 may be movable from a first position (FIGS. 3 and 4) to a second position (FIGS. 6 and 7) to move the retaining member 98 and the outer end portions of the levers 108. Movement of the outer end portions 118 of the levers 108 moves one of the input and output members 42 and 44 relative to the other of the input and output members to thereby interrupt meshing engagement of the annular arrays of teeth 50 and 56.

A latch member 170 may be provided to block movement of the actuator member 92 from the first position (FIGS. 3 and 4) to the second position (FIGS. 6 and 7). A motor 28 is operable to release the latch member from movement from a latching position to a release position. When the aircraft is disposed on the ground, force may be transmitted to the actuator member 92 to move the one annular array of teeth 56 into meshing engagement with the other annular array of teeth 50.

The present invention includes a plurality of different features. Anyone of these features may be used in combination with the other features of the invention or may be used separately from the other features of the invention. It is contemplated that one or more of the features of the invention may be used in combination with features found in the prior art. For example, the clutch 20 may be operated by apparatus other than the yoke 92 and disengagement levers 108. Although the drive apparatus 16 has been described herein in conjunction with a pump 14 in an aircraft, the drive apparatus 16 may be used with driven assemblies other than a pump if desired.

What is claimed is:

1. A drive apparatus for use in transmitting force from a source of power to a driven assembly in an aircraft, said drive apparatus comprising an input member connectable with a source of power and rotatable about a drive axis, an output member connectable with the driven assembly and rotatable about the drive axis, a first annular array of teeth connected with said input member and extending around the drive axis, a second annular array of teeth connected with said output member and extending around the drive axis, a first spring connected with said first and second annular arrays of teeth to urge said first and second annular arrays of teeth into meshing engagement, said first annular array of teeth being effective to transmit force from said input member to said second annular array of teeth and said output member when said first and second annular arrays of teeth are disposed in meshing engagement, a plurality of levers extending outward from one of said input and output members, each lever of said plurality of levers having a first end portion connected with said one of said input and output members and a second end portion which is spaced from said one of said input and output members, a retaining member connected with said second end portions of said levers of said plurality of levers, an actuator member which is movable from a first position to a second position to move said retaining member along the drive axis, an actuator spring which urges said actuator member toward the second position, a latch member having a latching position and a release position, said latch member blocks movement of said actuator member from the first position to the second position when said latch member is in a latching position, and a motor which is operable to release said latch member for movement from the latching position to a release position to release said actuator member for movement from the first position to the second position under the influence of force transmitted to said actuator member from said actuator spring, said retaining member being movable along the drive axis by said actuator member under the influence of force transmitted from said actuator spring to said actuator member as said actuator member moves from the first position to the second position, said actuator member transmits force from said actuator spring to said latch member to move said latch member from the latching position to the release position upon operation of said motor to release said latch member for movement from the latching position to the release position, said second end portions of said levers of said plurality of levers being movable along the drive axis with said retaining member to move said one of said input and output members along the drive axis against the influence of said first spring, one of said first and second annular arrays of teeth being movable along the drive axis with said one of said input and output members to separate said first and second annular arrays of teeth and interrupt transmission of force from said input member to said output member.

2. A drive apparatus as set forth in claim 1 wherein said actuator member is movable from the second position back to the first position against the influence of said actuator spring under the influence of force transmitted to said actuator member from a source of force other than said motor.

3. A drive apparatus as set forth in claim 1 further including a drive shaft having a first end portion connected with said output member and a second end portion connected with the driven assembly, said drive shaft having a central cavity into which said output member extends, said first end portion of each of said levers of said plurality of levers extends through an opening in said drive shaft into engagement with a portion of said output member disposed in said central cavity in said drive shaft.

4. A drive apparatus as set forth in claim 1 wherein said actuator member includes first and second pivot arms which are disposed on opposite sides of the drive axis and are pivotal about an actuator axis which extends transverse to the drive axis, said first and second pivot arms of said actuator member being pivotal under the influence of force transmitted to said actuator member from said actuator spring to pivot said actuator member from the first position to the second position about the actuator axis, said first and second pivot arms being effective to transmit force to move said retaining member along the drive axis upon pivotal movement of said actuator member from the first position to the second position.

5. A drive apparatus for use in transmitting force from a source of power to a driven assembly in an aircraft, said drive apparatus comprising an input member connectable with a source of power and rotatable about a drive axis, an output member connectable with the driven assembly and rotatable about the drive axis, a first annular array of teeth connected with said input member and extending around the drive axis, a second annular array of teeth connected with said output member and extending around the drive axis, a first spring connected with said first and second annular arrays of teeth to urge said first and second annular arrays of teeth into meshing engagement, said first annular array of teeth being effective to transmit force from said input member to said second annular array of teeth and said output member when said first and second annular arrays of teeth are disposed in meshing engagement, a plurality of levers extending outward from one of said input and output members, each lever of said plurality of levers having a first end portion connected with said one of said input and output members and a second end portion which is spaced from said one of said input and output members, a retaining member connected with said second end portions of said levers of said plurality of levers, an actuator member which is movable from a first position to a second position to move said retaining member along the drive axis, an actuator spring which urges said actuator member toward the second position, a latch member having a latching position and a release position, said latch member blocks movement of said actuator member from the first position to the second position when said latch member is in a latching position, a motor which is operable to release said latch member for movement from the latching position to a release position to release said actuator member for movement from the first position to the second position under the influence of force transmitted to said actuator member from said actuator spring, said retaining member being movable along the drive axis by said actuator member under the influence of force transmitted from said actuator spring to said actuator member as said actuator member moves from the first position to the second position, said second end portions of said levers of said plurality of levers being movable along the drive axis with said retaining member to move said one of said input and output members along the drive axis against the influence of said first spring, one of said first and second annular arrays of teeth being movable along the drive axis with said one of said input and output members to separate said first and second annular arrays of teeth and interrupt transmission of force from said input member to said output member, and a drive shaft having a first end portion connected with said output member and a second end portion connected with the driven assembly, said drive shaft having a central cavity into which said output member extends, said first end portion of each of said levers of said plurality of levers extends through an opening in said drive shaft into engagement with a portion of said output member disposed in said central cavity in said drive shaft.

6. A drive apparatus as set forth in claim 5 wherein said actuator member includes first and second pivot arms which are disposed on opposite sides of the drive axis and are pivotal about an actuator axis which extends transverse to the drive axis, said first and second pivot arms of said actuator member being pivotal under the influence of force transmitted to said actuator member from said actuator spring to pivot said actuator member from the first position to the second position about the actuator axis, said first and second pivot arms being effective to transmit force to move said retaining member along the drive axis upon pivotal movement of said actuator member from the first position to the second position.

7. A drive apparatus for use in transmitting force from a source of power to a driven assembly in an aircraft, said drive apparatus comprising an input member connectable with a source of power and rotatable about a drive axis, an output member connectable with the driven assembly and rotatable about the drive axis, a first annular array of teeth connected with said input member and extending around the drive axis, a second annular array of teeth connected with said output member and extending around the drive axis, a first spring connected with said first and second annular arrays of teeth to urge said first and second annular arrays of teeth into meshing engagement, said first annular array of teeth being effective to transmit force from said input member to said second annular array of teeth and said output member when said first and second annular arrays of teeth are disposed in meshing engagement, a plurality of levers extending outward from one of said input and output members, each lever of said plurality of levers having a first end portion connected with said one of said input and output members and a second end portion which is spaced from said one of said input and output members, a retaining member connected with said second end portions of said levers of said plurality of levers, an actuator member which is movable from a first position to a second position to move said retaining member along the drive axis, an actuator spring which urges said actuator member toward the second position, a latch member having a latching position and a release position, said latch member blocks movement of said actuator member from the first position to the second position when said latch member is in a latching position, a motor which is operable to release said latch member for movement from the latching position to a release position to release said actuator member for movement from the first position to the second position under the influence of force transmitted to said actuator member from said actuator spring, said retaining member being movable along the drive axis by said actuator member under the influence of force transmitted from said actuator spring to said actuator member as said actuator member moves from the first position to the second position, said second end portions of said levers of said plurality of levers being movable along the drive axis with said retaining member to move said one of said input and output members along the drive axis against the influence of said first spring, one of said first and second annular arrays of teeth being movable along the drive axis with said one of said input and output members to separate said first and second annular arrays of teeth and interrupt transmission of force from said input member to said output member, said actuator member includes first and second pivot arms which are disposed on opposite sides of the drive axis and are pivotal about an actuator axis which extends transverse to and is offset from the drive axis in a direction toward said latch member and a connector arm which extends between said first and second pivot arms, said first and second pivot arms of said actuator member being pivotal under the influence of force transmitted to said actuator member from said actuator spring to pivot said actuator member from the first position to the second position about the actuator axis, said first and second pivot arms being effective to transmit force to move said retaining member along the drive axis upon pivotal movement of said actuator member from the first position to the second position.

8. An assembly comprising an aircraft which is operable between an airborne condition and a landed condition in which said aircraft is not airborne, a drive apparatus is disposed on said aircraft for use in transmitting force from a source of power to a driven assembly In said aircraft, said drive apparatus including an input member connectable with a source of power and rotatable about a drive axis, an output member connectable with the driven assembly and rotatable about the drive axis, a first annular array of teeth connected with said input member, a second annular array of teeth connected with said output member, an actuator assembly is operable when said aircraft is in the airborne condition to move one of said input and output members along the drive axis in a direction away from the other of said input and output members to move one of said first and second annular arrays of teeth along the drive axis from a first position in which said first and second annular arrays of the teeth are disposed in meshing engagement and in which power is transmitted from said input member through said first and second annular arrays of teeth to drive the driven assembly to a second position in which said first and second annular arrays of teeth are spaced apart from each other along the drive axis to interrupt transmission of power from the source of power through the first and second annular arrays of teeth to the driven assembly, said actuator assembly being operable only when said aircraft is no longer in the airborne condition and is in the landed condition to move said one of said input and output members along the drive axis in a direction toward the other of said input and output members to move said one of said first and second annular arrays of teeth from the second position in which said first and second annular arrays of teeth are spaced apart from each other along the drive axis to the first position in which said first and second annular arrays of teeth are disposed in meshing engagement with each other to enable power to be transmitted from said input member through said first and second annular arrays of teeth to drive the driven assembly, said one of said first and second annular arrays of teeth being movable from the second position back to the first position under the influence of force transmitted to said actuator assembly only when said aircraft is in the landed condition to thereby prevent operation of said actuator assembly and resumption of transmission of power from the source of power through said first and second annular arrays of teeth to the driven assembly when said aircraft is in the airborne condition.

9. A drive apparatus as set forth in claim 8 wherein said actuator assembly includes a lever which is pivotal about a first pivot axis extending transverse to the drive axis, an actuator spring which continuously urges said lever to pivot about the first pivot axis, a latch member which is pivotal about a second pivot axis, and a motor which is operable which said aircraft is in the airborne condition to enable pivotal movement of said latch member about the second pivot axis to release said lever for pivotal movement about the first pivot axis under the influence of force transmitted from said actuator spring.

10. A drive apparatus as set forth in claim 8 wherein said actuator assembly includes a latch member which is pivotal from a latched position to an unlatched position, an actuator lever which is pivotal from a first position to a second position, an actuator spring which applies force to said actuator lever urging said actuator lever toward the second position, a motor which is operable when said aircraft is in the airborne condition to release said latch member for movement from the latched position to the unlatched position under the influence of force transmitted from said actuator spring through actuator lever to said latch member, said actuator lever being movable from the first position to the second position under the influence of said actuator spring to effect movement of said one of said input and output members along the drive axis under the influence of force transmitted from said actuator spring, said motor being ineffective to move said latch member from the unlatched position to the latched position.

11. A drive apparatus as set forth in claim 8 wherein said actuator assembly includes a plurality of levers, each of said levers of said plurality of levers having a first end portion connected with said one of said input and output members and a second end portion spaced from said one of said input and output members, each of said levers of said plurality of levers being pivotal about an axis which extends transverse to the drive axis, a retaining member extending around the drive axis, said second end portion of each lever of said plurality of levers being connected with said retaining member, and an actuator spring from which force is transmitted to said retaining member to move said retaining member along the drive axis, said levers of said plurality of levers being pivotal under the influence of force transmitted from said actuator spring to move said one of said input and output members along the drive axis.

12. A drive system as set forth in claim 8 further including a cylindrical cavity formed in said one of said input and output members, a shaft connected with the other of said input and output members and extending into the cavity formed in said one of said input and output members, and a spring disposed in the cavity in said one of said input and output members, said spring being effective to apply force to said shaft to urge said first and second arrays of teeth into meshing engagement with each other.

* * * * *